US010180763B2

(12) United States Patent
Saether et al.

(10) Patent No.: US 10,180,763 B2
(45) Date of Patent: *Jan. 15, 2019

(54) TOUCH DETECTION

(71) Applicant: Atmel Corporation, Chandler, AZ (US)

(72) Inventors: Terje Saether, Trondheim (NO); Carl Olof Fredrik Jonsson, Gavle (SE)

(73) Assignee: Atmel Corporation, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,169

(22) Filed: Apr. 30, 2018

(65) Prior Publication Data

US 2018/0253171 A1   Sep. 6, 2018

Related U.S. Application Data

(63) Continuation of application No. 15/158,843, filed on May 19, 2016, now Pat. No. 9,983,749.

(51) Int. Cl.
  *G06F 3/045* (2006.01)
  *G06F 3/044* (2006.01)
  *G06F 3/041* (2006.01)

(52) U.S. Cl.
  CPC ............ *G06F 3/044* (2013.01); *G06F 3/0412* (2013.01); *G06F 3/0416* (2013.01); *G06F 3/041* (2013.01)

(58) Field of Classification Search
  CPC combination set(s) only.
  See application file for complete search history.

(56) References Cited

U.S. PATENT DOCUMENTS

| 7,663,607 B2 | 2/2010 | Hotelling |
| 7,864,503 B2 | 1/2011 | Chang |
| 7,875,814 B2 | 1/2011 | Chen |

(Continued)

FOREIGN PATENT DOCUMENTS

WO   WO 2012/129247 A2   9/2012

OTHER PUBLICATIONS

U.S. Appl. No. 61/454,936, filed Mar. 21, 2011, Myers.

(Continued)

*Primary Examiner* — Temesghen Ghebretinsae
*Assistant Examiner* — Sosina Abebe
(74) *Attorney, Agent, or Firm* — Baker Botts L.L.P.

(57) ABSTRACT

A method includes driving, by a first driver circuit, a current through an electrode and detecting, by a sensing system, a touch based on a change in capacitance at the electrode. The first driver circuit includes a first operational transconductance amplifier and a first current mirror. A second current mirror is coupled to the sensing system. A first switch is coupled to the first current mirror. A second switch is coupled to the first current mirror and the first operational transconductance amplifier. A third switch is coupled to the first operational transconductance amplifier and the second current mirror. A fourth switch is coupled to the second current mirror. A fifth switch is coupled to the first operational transconductance amplifier. A sixth switch is coupled to the first operational transconductance amplifier. A seventh switch is coupled to the first operational transconductance amplifier, the first current mirror, and the second current mirror.

10 Claims, 13 Drawing Sheets

(56) References Cited

U.S. PATENT DOCUMENTS

| | | | |
|---|---|---|---|
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,723,824 B2 | 5/2014 | Myers | |
| 2008/0309635 A1 | 12/2008 | Matsuo | |
| 2009/0315854 A1 | 12/2009 | Matsuo | |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2013/0314109 A1* | 11/2013 | Kremin | G01R 27/2605 324/686 |
| 2014/0035601 A1* | 2/2014 | Fujiyoshi | G01R 35/00 324/684 |
| 2015/0214897 A1* | 7/2015 | Motamed | H03F 1/223 330/257 |
| 2016/0124455 A1* | 5/2016 | Sambucco | G05F 3/267 323/315 |
| 2017/0235423 A1* | 8/2017 | Hwang | G06F 3/0418 345/174 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
T. Saether, U.S. Appl. No. 15/158,843, Non-final Rejection, dated Oct. 20, 2017.
T. Saether, U.S. Appl. No. 15/158,843, Response to Non-final Rejection, dated Jan. 10, 2018.
T. Saether, U.S. Appl. No. 15/158,843, Notice of Allowance, dated Feb. 8, 2018.

* cited by examiner

TOUCH DETECTION

RELATED APPLICATION

This application is a continuation under 35 U.S.C. § 120 of U.S. application Ser. No. 15/158,843, filed May 19, 2016 and entitled Touch Detection, incorporated herein by reference.

TECHNICAL FIELD

This disclosure generally relates to touch detection.

BACKGROUND

According to an example scenario, a touch sensor detects the presence and position of an object (e.g., a user's finger or a stylus) within a touch-sensitive area of touch sensor array overlaid on a display screen, for example. In a touch-sensitive-display application, a touch sensor array allows a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other device. A control panel on a household or other appliance may include a touch sensor. There are a number of different types of touch sensors, such as for example resistive touch sensors, surface acoustic wave touch sensors, and capacitive touch sensors.

In one example, when an object physically touches a touch screen within a touch sensitive area of a touch sensor of the touch screen (e.g., by physically touching a cover layer overlaying a touch sensor array of the touch sensor) or comes within a detection distance of the touch sensor (e.g., by hovering above the cover layer overlaying the touch sensor array of the touch sensor), a change in capacitance may occur within the touch screen at a position of the touch sensor of the touch screen that corresponds to the position of the object within the touch sensitive area of the touch sensor. A touch sensor controller processes the change in capacitance to determine the position of the change of capacitance within the touch sensor (e.g., within a touch sensor array of the touch sensor).

BRIEF DESCRIPTION OF THE DRAWINGS

For a more complete understanding of the present disclosure and its advantages, reference is made to the following descriptions, taken in conjunction with the accompanying drawings, in which.

DESCRIPTION OF EXAMPLE EMBODIMENTS

Touch sensors can detect touches and/or objects near the touch sensor using various forms of touch sensing. One form of touch sensing is self-capacitance touch sensing. In self-capacitance touch sensing, the touch sensor includes one or more lines and/or electrodes positioned throughout the touch sensor. Each line or electrode has a capacitance that is measured. When an object, such as a finger, comes near the touch sensor and/or touches the touch sensor, the object affects the measured capacitance of the lines and/or electrodes near the object. The touch sensor detects the change in capacitance in those lines or electrodes, and in response, determines that a touch has occurred on those lines or electrodes.

Many self-capacitance touch sensors measure the capacitance of a line or electrode using a two-step process. The first step may be referred to as "driving" the line or electrode and the second step may be referred to as "sensing" the line or electrode. First, the touch sensor sends an electric signal, such as a voltage signal, through the line or electrode. Due to the capacitance of the line or electrode, the line or electrode is expected to respond to the electric signal in a particular way. Second, the response of the line or electrode to the electric signal is processed to determine whether a touch and/or object has occurred near or on the line or electrode. These two steps are performed sequentially and exclusive of one another.

As an example, an electrode is driven by an alternating voltage signal. Due to the resistance and capacitance of the electrode, the rate of change of the alternating voltage signal causes a current to flow through the electrode. The touch sensor measures this current to establish a baseline current for the electrode. Later, when a finger touches the touch sensor near the electrode, the finger affects the capacitance of the electrode. As a result, when the electrode is driven, the current flowing through the electrode is different from the baseline current. When the touch sensor senses the new current, it will detect that the new current is different from the baseline current, and as a result, determine that a touch has occurred on or near the electrode.

Figure 1:
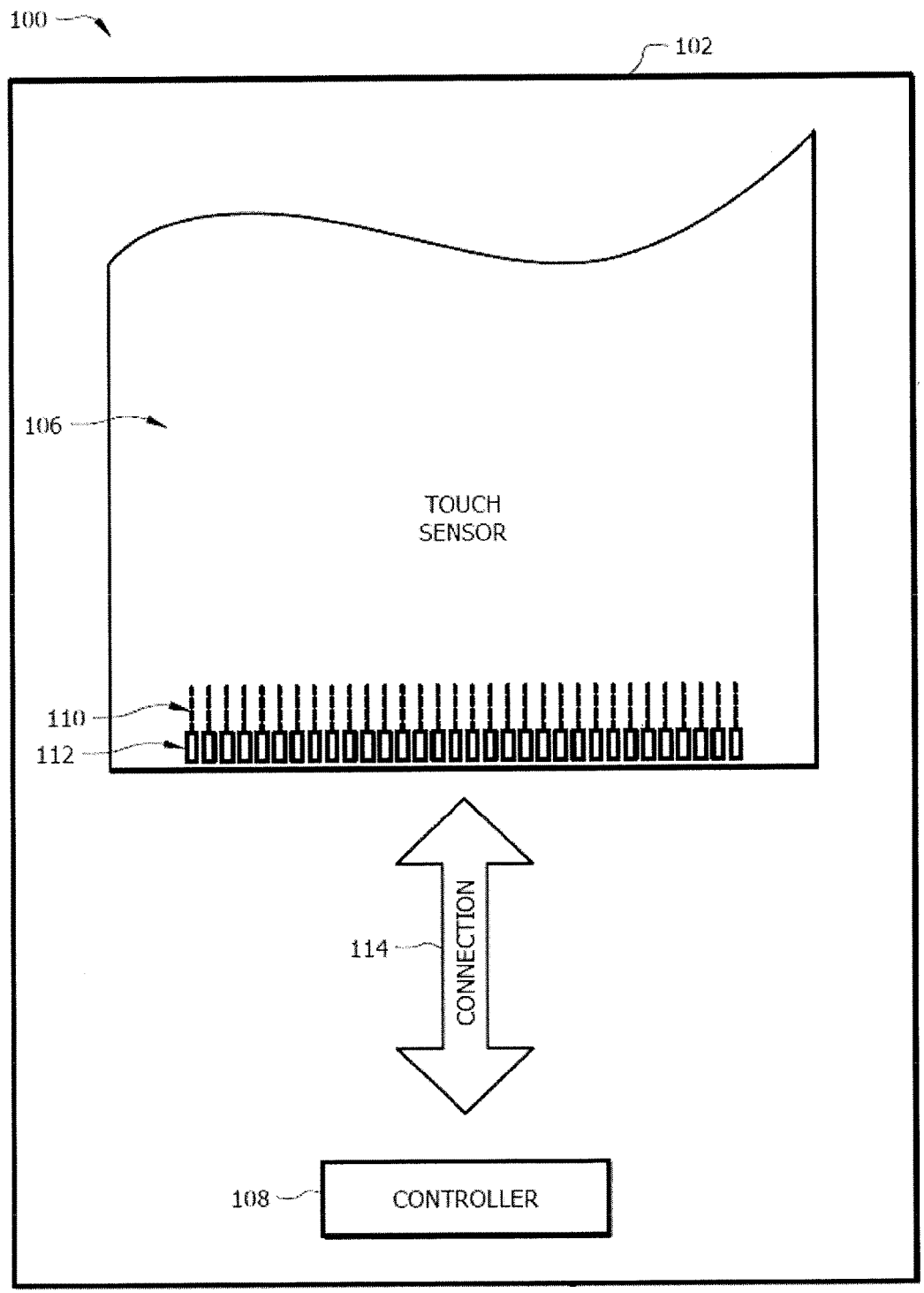
FIG. 1 illustrates an example system that includes a touch sensor, according to an embodiment of the present disclosure.
Figure 2:
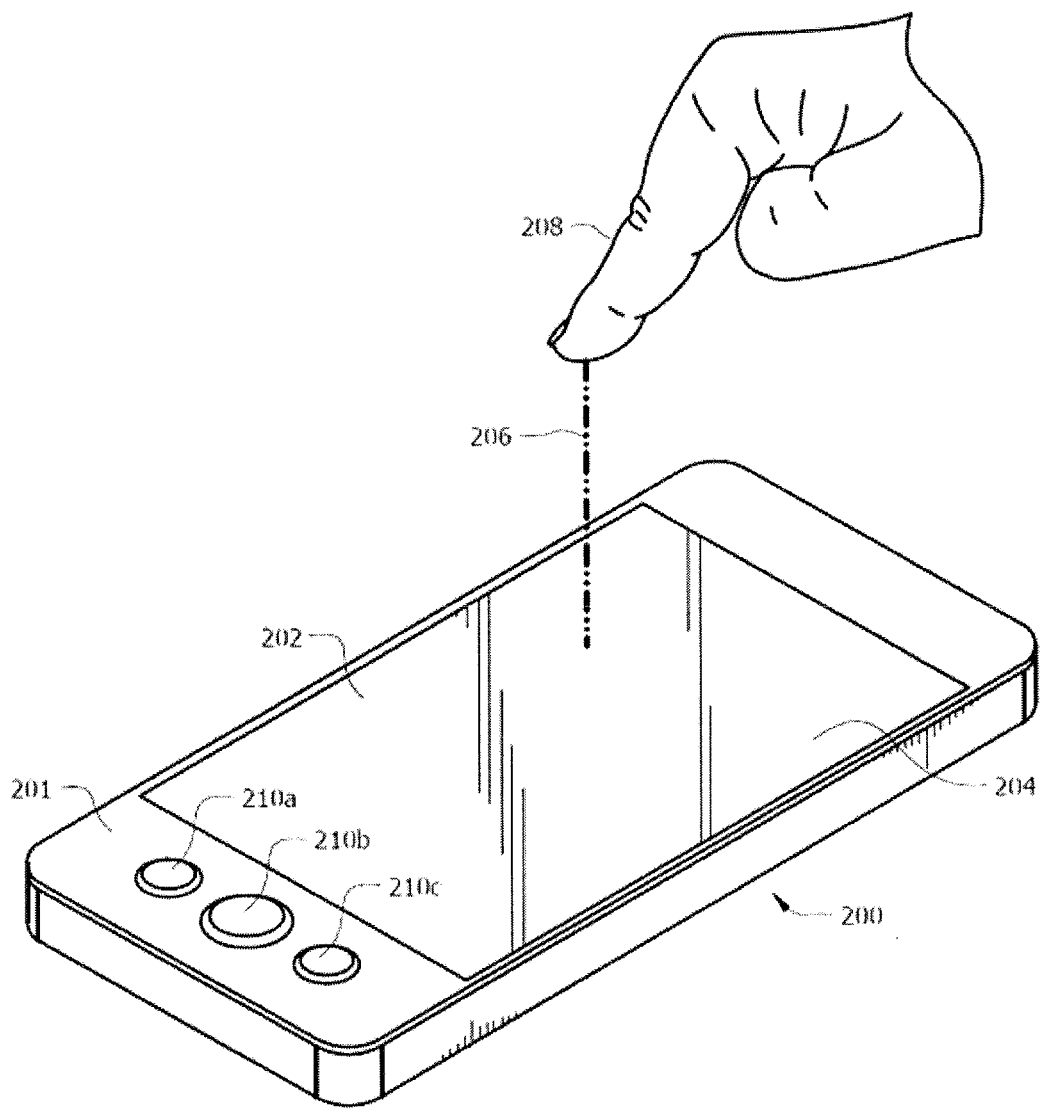
FIG. 2 illustrates an example device that houses the touch sensor, according to an embodiment of the present disclosure.
Figure 3:
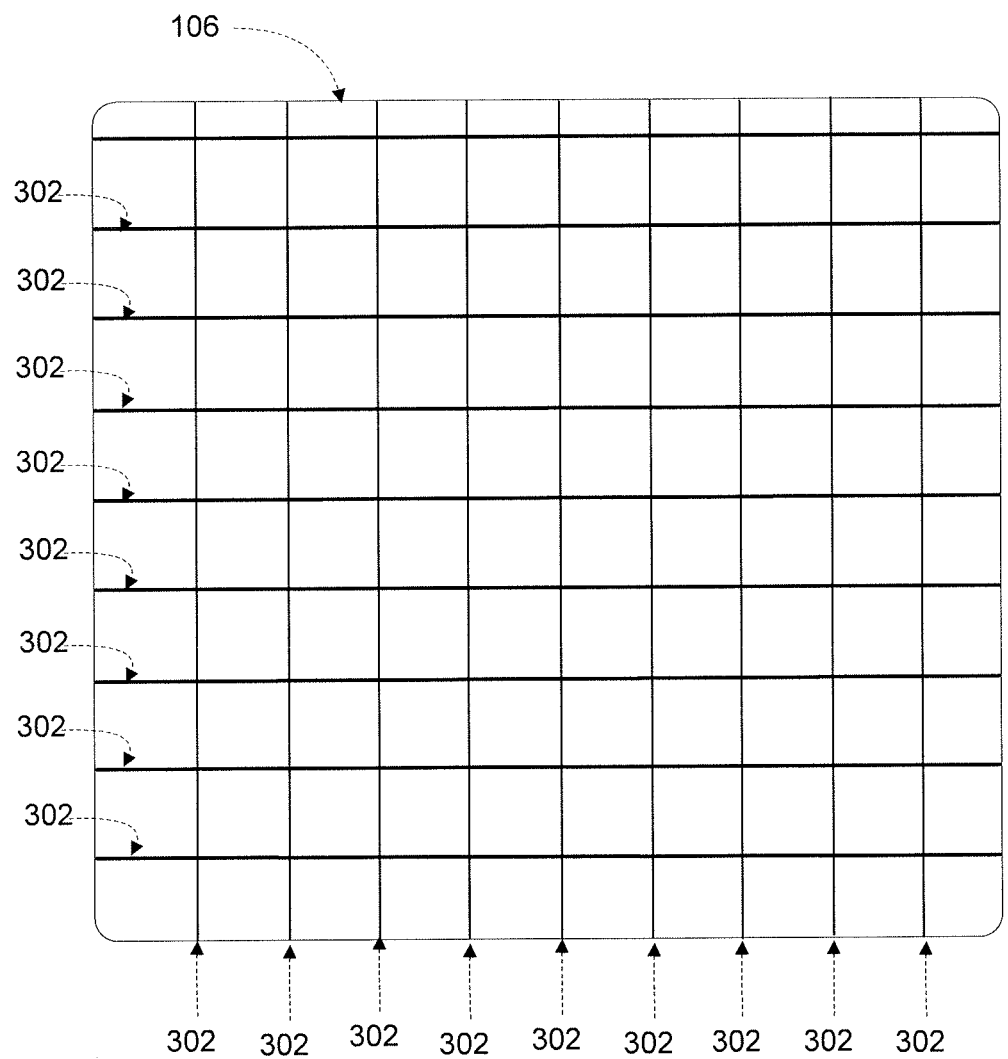
FIG. 3 illustrates an example touch sensor, according to an embodiment of the present disclosure.
Figure 4:
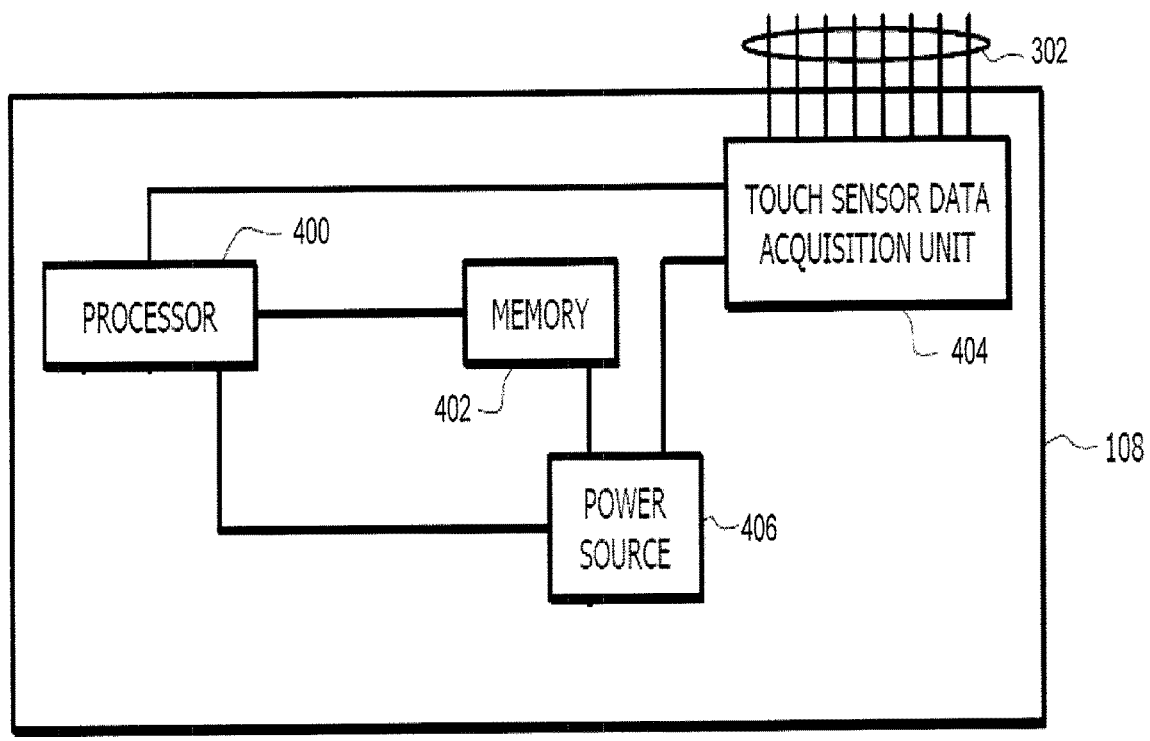
FIG. 4 illustrates a block diagram of an example touch sensor controller, according to an embodiment of the present disclosure.

This disclosure contemplates a self-capacitance touch sensor that includes a driver circuit which allows the touch sensor to both drive and sense an electrode continuously and at the same time. The driver circuit includes an operational transconductance amplifier coupled to a current mirror. An alternating voltage signal drives a current through the electrode. At the same time, the current mirror mirrors the current that is traveling through the electrode. The mirrored current is then measured and/or processed to determine if a touch and/or object is detected. In this manner, the driver circuit allows the touch sensor to both drive and sense the electrode continuously and simultaneously. The touch sensor will be described in more detail using FIGS. 1 through 10. FIGS. 1 and 2 will describe the touch sensor device generally. FIGS. 3 and 4 will describe the touch sensor device in more detail. FIGS. 5 through 10 will describe the driver circuit in more detail.

FIG. 1 illustrates an example system 100 that includes a touch sensor 102, according to an embodiment of the present disclosure. Touch sensor 102 includes touch sensor array 106 and touch sensor controller 108. Touch sensor array 106 and touch sensor controller 108 detect the presence and position of a touch or the proximity of an object within a touch-sensitive area of touch sensor array 106.

Touch sensor array 106 includes one or more touch-sensitive areas. In one embodiment, touch sensor array 106 includes an array of electrodes disposed on one or more substrates, which are made of a dielectric material. Reference to a touch sensor array encompasses both the electrodes of touch sensor array 106 and the substrate(s) on which they are disposed. Alternatively, reference to a touch sensor array encompasses the electrodes of touch sensor array 106, but not the substrate(s) on which they are disposed.

In one embodiment, an electrode is an area of conductive material forming a shape, such as for example a disc, square, rectangle, thin line, other shape, or a combination of these shapes. One or more cuts in one or more layers of conductive material (at least in part) creates the shape of an electrode, and the area of the shape is (at least in part) bounded by those cuts. In one embodiment, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In one embodiment, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates, in any combination, electrodes made of other conductive materials forming other shapes with other fill percentages having other patterns.

The shapes of the electrodes (or other elements) of a touch sensor array 106 constitute, in whole or in part, one or more macro-features of touch sensor array 106 array 10. One or more characteristics of the implementation of those shapes (such as, for example, the conductive materials, fills, or patterns within the shapes) constitute in whole or in part one or more micro-features of touch sensor array 106. In one embodiment, one or more macro-features of a touch sensor array 106 determine one or more characteristics of its functionality, and one or more micro-features of touch sensor array 106 determine one or more optical features of touch sensor array 106, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In one embodiment, a number of electrodes are disposed on the same or different surfaces of the same substrate. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 106. For example, the mechanical stack may include a first layer of optically clear adhesive (OCA) beneath a cover panel. The cover panel may be clear and made of a resilient material for repeated touching, such as for example glass, polycarbonate, or poly(methyl methacrylate) (PMMA). This disclosure contemplates cover panel being made of any material. The first layer of OCA may be disposed between the cover panel and the substrate with the conductive material forming the electrodes. The mechanical stack may also include a second layer of OCA and a dielectric layer (which may be made of PET or another material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 106 and touch sensor controller 108. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates other mechanical stacks with any number of layers made of any materials and having any thicknesses. For example, in one embodiment, a layer of adhesive or dielectric may replace the dielectric layer, second layer of OCA, and air gap described above, with there being no air gap in the display.

One or more portions of the substrate of touch sensor array 106 may be made of polyethylene terephthalate (PET) or another material. This disclosure contemplates any substrate with portions made of any material(s). In one embodiment, one or more electrodes in touch sensor array 106 are made of ITO in whole or in part. Additionally or alternatively, one or more electrodes in touch sensor array 106 are made of fine lines of metal or other conductive material. For example, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any electrodes made of any materials.

In one embodiment, touch sensor array 106 implements a capacitive form of touch sensing. In a self-capacitance implementation, touch sensor array 106 includes an array of electrodes of a single type that each form a capacitive node. When an object touches or comes within proximity of the capacitive node, a change in self-capacitance occurs at the capacitive node and touch sensor controller 108 measures the change in capacitance, for example, as a change in the amount of charge implemented to raise the voltage at the capacitive node by a predetermined amount. By measuring changes in capacitance throughout the array, touch sensor controller 108 determines the position of the touch or proximity within touch-sensitive areas of touch sensor array 106. This disclosure contemplates any form of capacitive touch sensing.

As described above, a change in capacitance may indicate a touch or proximity input at the position of the electrode. Touch sensor controller 108 detects and processes the change in capacitance to determine the presence and position of the touch or proximity input. In one embodiment, touch sensor controller 108 then communicates information about the touch or proximity input to one or more other components (such as one or more central processing units (CPUs)) of a device that includes touch sensor array 106 and touch sensor controller 108, which may respond to the touch or proximity input by initiating a function of the device (or an application running on the device). Although this disclosure describes a particular touch sensor controller 108 having particular functionality with respect to a particular device and a particular touch sensor 102, this disclosure contemplates other touch sensor controllers having any functionality with respect to any device and any touch sensor.

In one embodiment, touch sensor controller 108 is implemented as one or more integrated circuits (ICs), such as for example general-purpose microprocessors, microcontrollers, programmable logic devices or arrays, application-specific ICs (ASICs). Touch sensor controller 108 comprises any combination of analog circuitry, digital logic, and digital non-volatile memory. In one embodiment, touch sensor controller 108 is disposed on a flexible printed circuit (FPC) bonded to the substrate of touch sensor array 106, as described below. The FPC may be active or passive. In one embodiment, multiple touch sensor controllers 108 are disposed on the FPC.

In an example implementation, touch sensor controller 108 includes a processor unit, a drive unit, a sense unit, and a storage unit. In such an implementation, the drive unit supplies drive signals to the electrodes of touch sensor array 106, and the sense unit senses charge at the electrodes of touch sensor array 106 and provides measurement signals to the processor unit representing capacitances. The processor unit controls the supply of drive signals to the electrodes by the drive unit and processes measurement signals from the sense unit to detect and process the presence and position of a touch or proximity input within touch-sensitive areas of touch sensor array 106. The processor unit also tracks changes in the position of a touch or proximity input within touch-sensitive areas of touch sensor array 106. The storage unit stores programming for execution by the processor unit, including programming for controlling the drive unit to supply drive signals to the drive electrodes, programming for processing measurement signals from the sense unit, and other programming. Although this disclosure describes a particular touch sensor controller 108 having a particular implementation with particular components, this disclosure contemplates touch sensor controller having other implementations with other components.

Tracks 110 of conductive material disposed on the substrate of touch sensor array 106 couple the electrodes of touch sensor array 106 to connection pads 112, also disposed on the substrate of touch sensor array 106. As described below, connection pads 112 facilitate coupling of tracks 110 to touch sensor controller 108. Tracks 110 may extend into or around (e.g., at the edges of) touch-sensitive areas of touch sensor array 106. In one embodiment, particular tracks 110 provide connections for coupling touch sensor controller 108 to electrodes of touch sensor array 106, through which the drive unit of touch sensor controller 108 supplies drive signals to the electrodes, and other tracks 110 provide sense connections for coupling touch sensor controller 108 to electrodes of touch sensor array 106, through which the sense unit of touch sensor controller 108 senses charge at the electrodes of touch sensor array 106.

Tracks 110 are made of fine lines of metal or other conductive material. For example, the conductive material of tracks 110 may be copper or copper-based and have a width of approximately 100 μm or less. As another example, the conductive material of tracks 110 may be silver or silver-based and have a width of approximately 100 μm or less. In one embodiment, tracks 110 are made of ITO in whole or in part in addition or as an alternative to the fine lines of metal or other conductive material. Although this disclosure describes particular tracks made of particular materials with particular widths, this disclosure contemplates tracks made of other materials and/or other widths. In addition to tracks 110, touch sensor array 106 may include one or more ground lines terminating at a ground connector (which may be a connection pad 112) at an edge of the substrate of touch sensor array 106 (similar to tracks 110).

Connection pads 112 may be located along one or more edges of the substrate, outside a touch-sensitive area of touch sensor array 106. As described above, touch sensor controller 108 may be on an FPC. Connection pads 112 may be made of the same material as tracks 110 and may be bonded to the FPC using an anisotropic conductive film (ACF). In one embodiment, connection 114 includes conductive lines on the FPC coupling touch sensor controller 108 to connection pads 112, in turn coupling touch sensor controller 108 to tracks 110 and to the drive or sense electrodes of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

FIG. 2 illustrates an example device 200 that houses touch sensor 102, according to an embodiment of the present disclosure. Device 200 is any personal digital assistant, cellular telephone, smartphone, tablet computer, and the like. In one embodiment, device 200 includes other types of devices, such as automatic teller machines (ATMs), home appliances, personal computers, and any other such device having a touch screen. In the illustrated example, components of system 100 are internal to device 200. Although this disclosure describes a particular device 200 having a particular implementation with particular components, this disclosure contemplates any device 200 having any implementation with any components.

A particular example of device 200 is a smartphone that includes a housing 201 and a touch screen display 202 occupying a portion of a surface 204 of housing 201 of device 200. In an embodiment, housing 201 is an enclosure of device 200, which contain internal components (e.g., internal electrical components) of device 200. Touch sensor 102 may be coupled, directly or indirectly, to housing 201 of device 200. Touch screen display 202 may occupy a significant portion or all of a surface 204 (e.g., one of the largest surfaces 204) of housing 201 of device 200. Reference to a touch screen display 202 includes cover layers that overlay the actual display and touch sensor elements of device 200, including a top cover layer (e.g., a glass cover layer). In the illustrated example, surface 204 is a surface of the top cover layer of touch screen display 202. In an embodiment, the top cover layer (e.g., a glass cover layer) of touch screen display 200 is considered part of housing 201 of device 200.

In one embodiment, the large size of touch screen display 202 allows the touch screen display 202 to present a wide variety of data, including a keyboard, a numeric keypad, program or application icons, and various other interfaces. In one embodiment, a user interacts with device 200 by touching touch screen display 202 with a stylus, a finger, or any other object in order to interact with device 200 (e.g., select a program for execution or to type a letter on a keyboard displayed on the touch screen display 202). In one embodiment, a user interacts with device 200 using multiple touches to perform various operations, such as to zoom in or zoom out when viewing a document or image. In one embodiment, touch screen display 202 does not change or changes only slightly during device operation, and recognizes only single touches.

Users may interact with device 200 by physically impacting surface 204 (or another surface) of housing 201 of device 200, shown as impact 206, using an object 208, such as, for example, one or more fingers, one or more styluses, or other objects. In one embodiment, surface 204 is a cover layer that overlies touch sensor array 106 and a display of device 200. Touch sensor 102 detects these touches and device 200 can be programmed to respond to these detected touches in any manner.

Device 200 includes buttons 210, which may perform any purpose in relation to the operation of device 200. One or more of buttons 210 (e.g., button 210b) may operate as a so-called "home button" that, at least in part, indicates to device 200 that a user is preparing to provide input to touch sensor 102 of device 200.

FIG. 3 illustrates an example touch sensor array 106 according to an embodiment of the present disclosure. As illustrated in FIG. 3, touch sensor array 106 includes electrodes 302 arranged in a grid. This disclosure contemplates electrodes 302 being arranged throughout touch sensor array 106 in any manner, pattern and/or style.

In an embodiment, touch sensor array 106 implements self-capacitance touch sensing, wherein each electrode 302 is driven and sensed independent of the other electrodes 302. Each electrode 302 is driven by sending an electric signal through the electrode 302. Each electrode 302 has a resistance and a capacitance associated with the electrode 302. As a result, each electrode 302 is sensed by measuring the signal response of the electrode 302 to the electric signal sent through electrode 302. For example, if the electric signal is a voltage signal, the current response of electrode 302 to the voltage signal can be measured and/or processed to determine whether a touch is detected on or at electrode 302. When an object such as a finger is proximate electrode 302, the finger affects the capacitance of electrode 302. As a result, the current response of electrode 302 to the voltage signal changes. Touch sensor 102 and/or touch sensor controller 108 detects that change and determines that a touch on electrode 302 has occurred. As shown in FIG. 3, certain electrodes 302 appear to intersect (in plain view) at certain locations on touch sensor array 106, although it is noted that these intersecting electrodes 302 are actually electrically isolated from one another. When a touch occurs near one of these intersections, the two electrodes 302 that form that intersection are expected to produce a different signal response to the electric signal. Touch sensor 102 and/or controller 108 can detect the different signal response in these electrodes 302 and determine that the touch occurred at the intersection of the two electrodes 302. As a result, touch sensor 102 and/or controller 108 can determine the location of a touch on touch sensor array 106.

In an embodiment, driving and sensing electrodes 302 is a two-step process where the driving and sensing steps are performed sequentially and independently of each other. In one embodiment, however, touch sensor 102 drives and senses electrodes 302 simultaneously and continuously.

FIG. 4 illustrates a block diagram of an example touch sensor controller 108 according to an embodiment of the present disclosure. As illustrated in FIG. 4, touch sensor controller 108 includes a processor 400, a memory 402, and a touch sensor data acquisition unit 404. This disclosure contemplates the components of touch sensor controller 108 being configured to perform any of the functions of touch sensor controller 108 described herein. Although this disclosure describes a particular touch sensor controller 108 having a particular implementation with particular components, this disclosure contemplates touch sensor controller 108 having any implementation with any components. Furthermore, although FIG. 4 illustrates particular components of touch sensor controller 108 being coupled together in a particular arrangement, the present disclosure contemplates the components of touch sensor controller 108 being coupled together in other manners, according to particular implementations.

Processor 400 is operable to process data. In an embodiment, processor 400 is any electronic circuitry, including, but not limited to microprocessors, application specific integrated circuits (ASIC), application specific instruction set processor (ASIP), and/or state machines, that communicatively couples to memory 402 and controls the operation of device 200. Processor 400 may implement an 8-bit architecture, a 16-bit architecture, a 32-bit architecture, a 64-bit architecture, or of any other architecture. Processor 400 includes an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 400 includes other hardware and software that operates to control and process information. Processor 400 executes software stored on memory to perform any of the functions described herein. Processor 400 controls the operation and administration of device 200 by processing information received from other components of device 200, such as memory 402 and touch sensor data acquisition unit 404. Processor 400 may be a programmable logic device, a microcontroller, a microprocessor, a processing device, or any combination of the preceding. Processor 400 is not limited to a single processing device and may encompass multiple processing devices.

Memory 402 stores, either permanently or temporarily, data, operational software, or other information for processor 400. Memory 402 includes any one or a combination of volatile or non-volatile local or remote devices that store information. For example, memory 402 may include random access memory (RAM), read only memory (ROM), magnetic storage devices, optical storage devices, or any other information storage device or a combination of these devices. The software represents any set of instructions, logic, or code embodied in a computer-readable storage medium. For example, the software may be embodied in memory 402, a disk, a CD, or a flash drive. In one embodiment, the software includes an application executable by processor 400 to perform one or more of the functions described herein.

Touch sensor data acquisition unit 404 includes a component or collection of components that interacts with touch sensor array 106 to detect objects in proximity to touch sensor array 106. In one embodiment, touch sensor data acquisition unit 404 includes a drive unit 408 and a sense unit 410. In such an implementation, the drive unit 408 supplies drive signals to the electrodes of touch sensor array 106, and the sense unit 410 senses charge and/or current at the electrodes of touch sensor array 106 and provides measurement signals to processor 400 representing these measurements.

Processor 400 controls the supply of drive signals to the electrodes by the drive unit 408. In one embodiment, processor 400 sends an alternating voltage signal through operational transconductance amplifiers to the electrodes. In another embodiment, processor 400 also opens and closes various switches of an array of switches to control where and when the alternating voltage signal is sent. Processor 400 also processes measurement signals from the sense unit 410 to detect and process the presence and position of a touch or proximity input within touch-sensitive areas of touch sensor array 106. In one embodiment, processor 400 detects a change in current and/or voltage as the drive signals are sent to the electrodes to detect the presence of a touch or proximity input. Processor 400 also determines which electrodes correspond to the change in current and/or voltage to determine which electrodes are experiencing the touch, thereby determining the location of the touch. Processor 400 also tracks changes in the position of a touch or proximity input within touch-sensitive areas of touch sensor array 106. For example, as a touch moves to a different area of the touch sensitive area of touch sensor array 106, a change in current and/or voltage corresponding to different electrodes than before the touch moved will occur because the touch will affect the measured capacitance of the different electrodes. Processor 400 will detect the change in current and/or voltage corresponding to those electrodes and determine that the touch has moved. In one embodiment, the programming for execution by processor 400 stored by memory 402 includes programming for causing the drive unit 408 to supply drive signals to the drive electrodes, programming for processing measurement signals from the sense unit 410, and other programming.

Electrodes 302 couple to touch sensor controller 108 through touch sensor data acquisition unit 404. This disclosure contemplates electrodes 302 coupling to touch sensor controller 108 through any means. For example, electrodes 302 may couple to touch sensor controller 108 through one or more tracks 110, pads 112 and/or wires. Touch sensor data acquisition unit 104 can couple to electrodes 302, either directly or indirectly, through connections 114. In one embodiment, connection 114 includes conductive lines on the FPC coupling touch sensor controller 108 (through touch sensor data acquisition unit 404) to connection pads 112, in turn coupling touch sensor controller 108 (through touch sensor data acquisition unit 404) to tracks 110 and to the electrodes 302 of touch sensor array 106. In another embodiment, connection pads 112 are connected to an electromechanical connector (such as, for example, a zero insertion force wire-to-board connector). Connection 114 may or may not include an FPC. This disclosure contemplates any connection 114 between touch sensor controller 108 and touch sensor array 106.

Touch sensor data acquisition unit 404 receives electric signals from electrodes 302 such as, for example, current signals. Processor 400 and/or sense unit 410 measure the signals to determine whether a touch has occurred on any of electrodes 302. For example, processor 400 and/or sense unit 410 measure a current signal from each of electrodes 302 when no touch is occurring to establish a baseline current response for each electrode 302. Processor 400 and/or sense unit 410 then monitor the current response of each electrode 302. When a touch occurs on an electrode 302, the current response from that electrode 302 will change. Processor 400 and/or sense unit 410 will detect that the current response of the electrode 302 has changed and determine in response that a touch has occurred on or near that electrode 302.

Figure 5:
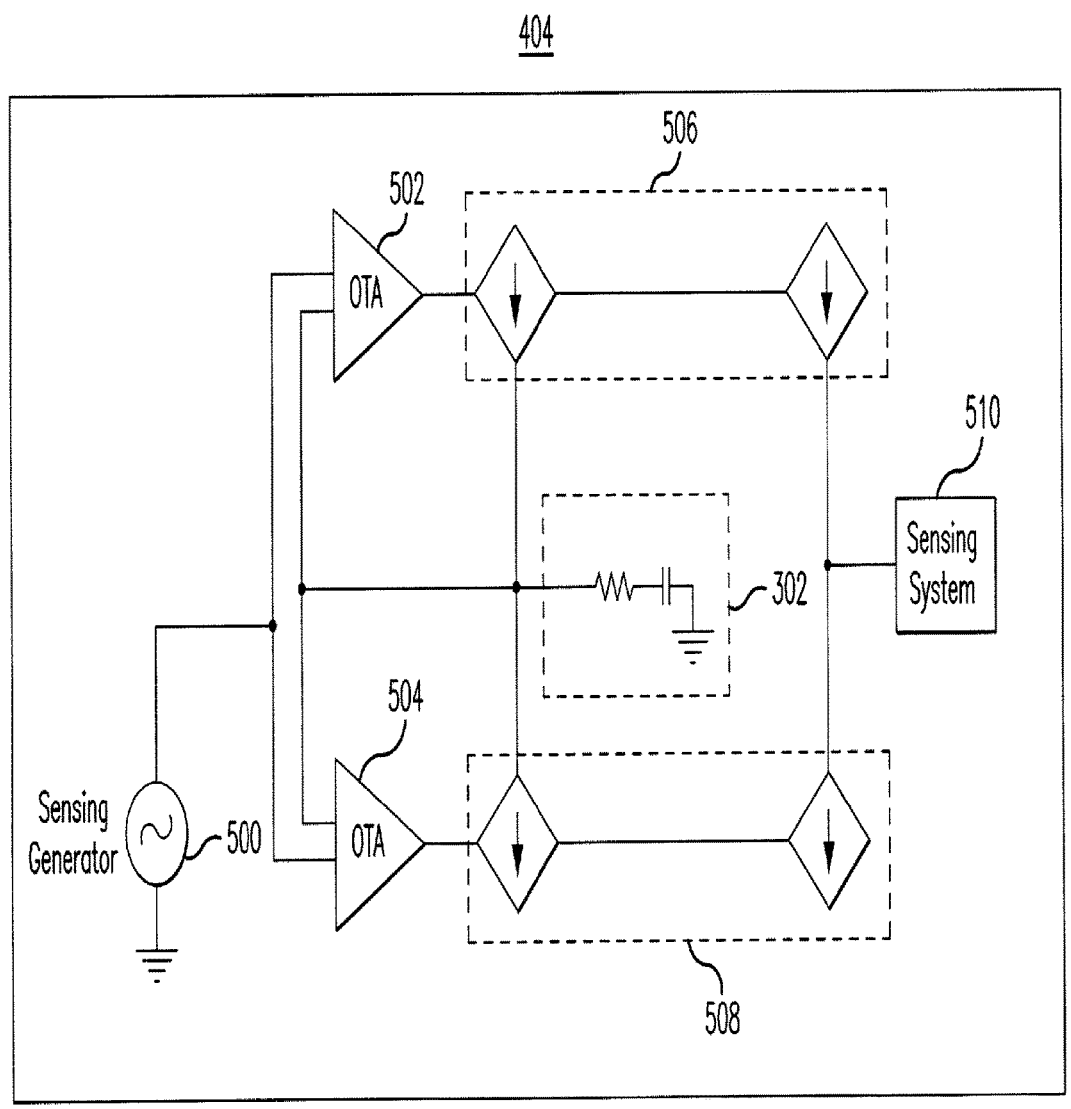
FIG. 5 illustrates an example touch sensor data acquisition unit, according to an embodiment of the present disclosure.

FIG. 5 illustrates an example touch sensor data acquisition unit 404 according to an embodiment of the present disclosure. As illustrated in FIG. 5, touch sensor data acquisition unit 404 includes a driver circuit 501 and a sensing system 510 coupled to the driver circuit 501. The driver circuit 501 includes a first operational transconductance amplifier 502 and a second operational transconductance amplifier 504. The driver circuit 501 also includes a first current mirror 506 and a second current mirror 508. Driver circuit 501 drives electrode 302 with a signal from signal generator 500 continuously and sensing system 510 senses electrode 302 continuously. Driver circuit 501 drives electrodes 302 and sensing system 510 senses electrode 302 simultaneously. Although this disclosure illustrates the driver circuit 501 and sensing system 510 as being part of touch sensor data acquisition unit 404, this disclosure contemplates any one of or a portion of any one of the driver circuit 501 and sensing system 510 being implemented in any component of touch sensor controller 108 such as, for example, processor 400 and memory 402.

Signal generator 500 drives electrode 302 by sending an electric signal through electrode 302. In one embodiment, signal generator 500 is part of the drive unit 408. This disclosure contemplates signal generator 500 sending any electric signal through electrode 302 such as, for example, a voltage signal or a current signal. In one embodiment, signal generator 500 sends an alternating voltage signal. This disclosure contemplates the alternative voltage signal being of any frequency and amplitude. This disclosure further contemplates the alternating voltage signal being of any appropriate type, such as for example, a square wave, triangle wave, and/or sinusoidal wave. Because of the resistance 512 and the capacitance 514 associated with electrode 302, the current flowing through electrode 302 will be directly proportional to the capacitance 514 of electrode 302 and the rate of change of the alternating voltage signal. Therefore, if the rate of change of the voltage signal from signal generator 500 and the current flowing through electrode 302 are measured by sensing system 510 and/or processor 400, then the capacitance associated with electrode 302 can be determined by sensing system 510 and/or processor 400. Processor 400 and/or sensing system 510 may then monitor hat capacitance to determine when a touch occurs on or near electrode 302. This disclosure contemplates any portion of signal generator 500 being formed from one or more components of device 200. For example, portions of signal generator 500 can be implemented using processor 400. As another example, portions of sensing system 510 can be implemented using processor 400 and memory 402.

In an embodiment, signal generator 500 is coupled to the driver circuit 501. Specifically, signal generator 500 is coupled to the first operational transconductance amplifier 502 and the second operational transconductance amplifier 504. The first operational transconductance amplifier 502 is configured to handle the portion of an alternating voltage signal that is positive. The second operational transconductance amplifier 504 is configured to handle the portion of an alternating voltage signal that is negative. The outputs of the first and second operational transconductance amplifiers 502 and 504 are fed back to an input of the first and second operational transconductance amplifier 502 and 504. This feedback loop stabilizes the operation of the first and second operational transconductance amplifiers 502 and 504.

The output of first operational transconductance amplifier 502 is coupled to first current mirror 506. The output of second operational transconductance amplifier 504 is coupled to second current mirror 508. Both first current mirror 506 and second current mirror 508 receive a current and then mirror that current. The current received by first current mirror 506 is not necessarily the same current received by second current mirror 508. In the illustrated example of FIG. 5, first current mirror 506 receives a current from first operational transconductance amplifier 502 and then mirrors that current to sensing system 510. As a result, first current mirror 506 produces a substantially identical current (e.g., within 10 milliAmp difference) to sensing system 510 as the current received by first current mirror 506. Similarly, second current mirror 508 receives a current from second operational transconductance amplifier 504 and then mirrors that current to sensing system 510. First current mirror 506 and second current mirror 508 also send the currents received from first and second operational transconductance amplifiers 502 and 504, respectively, through electrode 302. In this manner, electrode 302 is driven by a current, and at the same time, that current is mirrored and sensed by sensing system 510. As a result, the drive unit and sense unit do not disrupt each other's operation and electrode 302 is driven and sensed simultaneously and continuously.

Sensing system 510 is coupled to first current mirror 506 and second current mirror 508. Sensing system 510 receives the mirrored current from first current mirror 506 and second current mirror 508. Sensing system 510 measures that current to determine whether a touch has occurred on or near electrode 302. For example, sensing system 510 can establish a baseline current and then monitor for changes to that baseline current to determine whether a touch has occurred on or near electrode 302. In one embodiment, sensing system 510 establishes a baseline using a current from first current mirror 506 and detects a touch by comparing the baseline with a current from second current mirror 508. In another embodiment, sensing system 510 establishes a baseline current using currents from both first current mirror 506 and second current mirror 508 and detects a touch by comparing the baseline with currents from first current mirror 506 and second current mirror 508. In yet another embodiment, sensing system 510 establishes a baseline current using a current from first current mirror 506 and detects a touch by comparing the baseline with a current from first current mirror 506. This disclosure contemplates sensing system 510 being implemented using one or more components of touch sensor controller 108. For example, sensing system 510 can be implemented using one or more of touch sensor data acquisition unit 404, processor 400, and memory 402.

Figure 6:
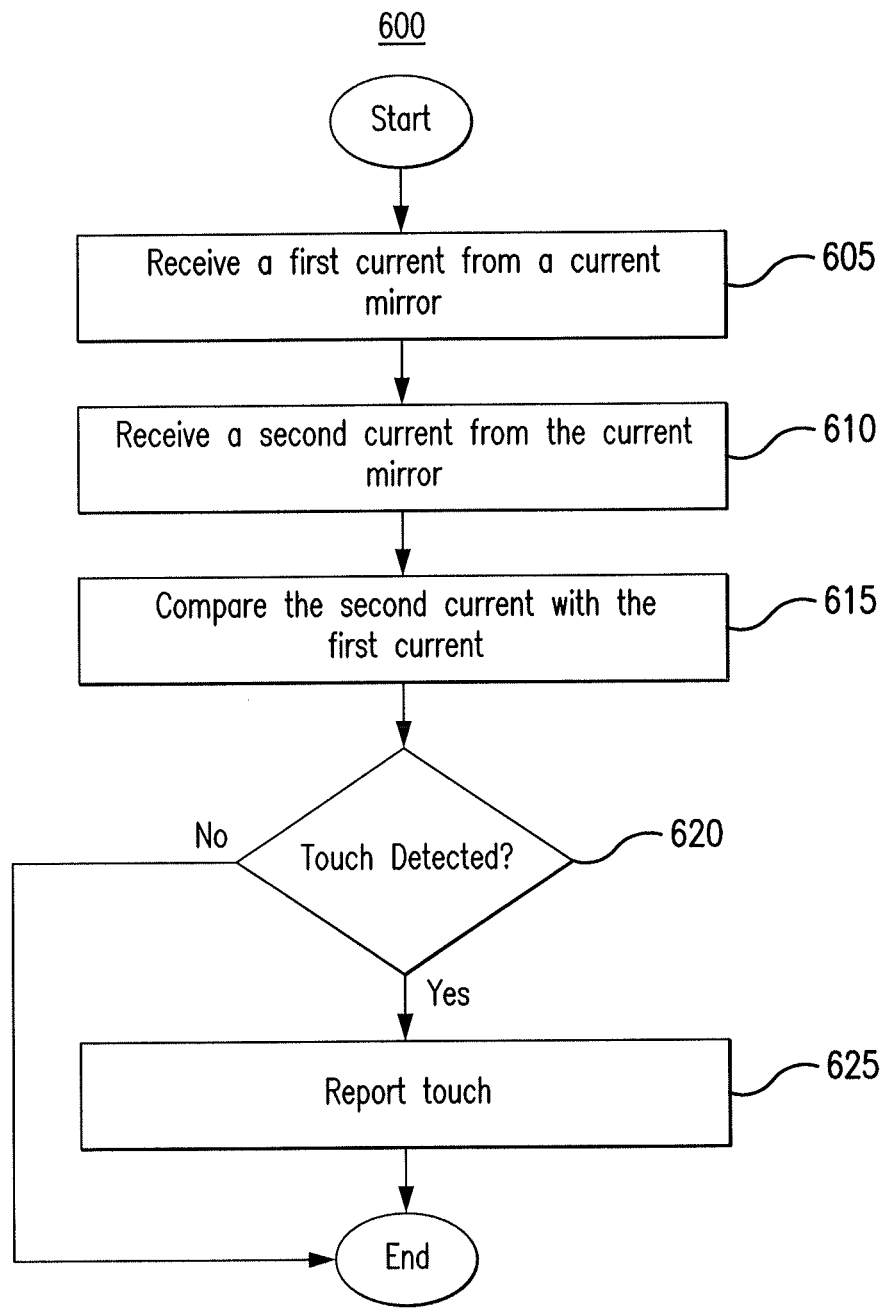
FIG. 6 illustrates an example method for detecting a touch, according to an embodiment of the present disclosure.

FIG. 6 illustrates an example method 600 for detecting a touch according to an embodiment of the present disclosure. In one embodiment, various components of touch sensor data acquisition unit 404 perform method 600. In step 605, a first operational transconductance amplifier drives a first current to a first current mirror. In step 610, the first current mirror mirrors the first current to produce a first mirrored current. The first operational transconductance amplifier drives a second current to the first current mirror in step 615. In step 620, the first current mirror mirrors the second current to produce a second current mirror. A sensing system compares the first mirrored current with the second mirrored current in step 625. The sensing system determines whether a touch was detected based on this comparison in step 630. For example, the sensing system may determine that a touch occurred if a magnitude of the first mirrored current is different from a magnitude of the second mirrored current. Conversely, the sensing system may determine that no touch occurred if a magnitude of the first mirrored current is substantially the same (e.g., within 100 milliAmps) as a magnitude of the second mirrored current. In one embodiment, because first current mirror 506 is configured to handle positive voltage and second current mirror 508 is configured to handle negative voltage, sensing system 510 will alternate between receiving the first mirrored current and the second mirrored current based on the frequency of signal generator 500. If the sensing system detects a touch, the sensing system reports the touch to processor 400 for example in step 635. Otherwise, the method concludes.

Figure 7A:
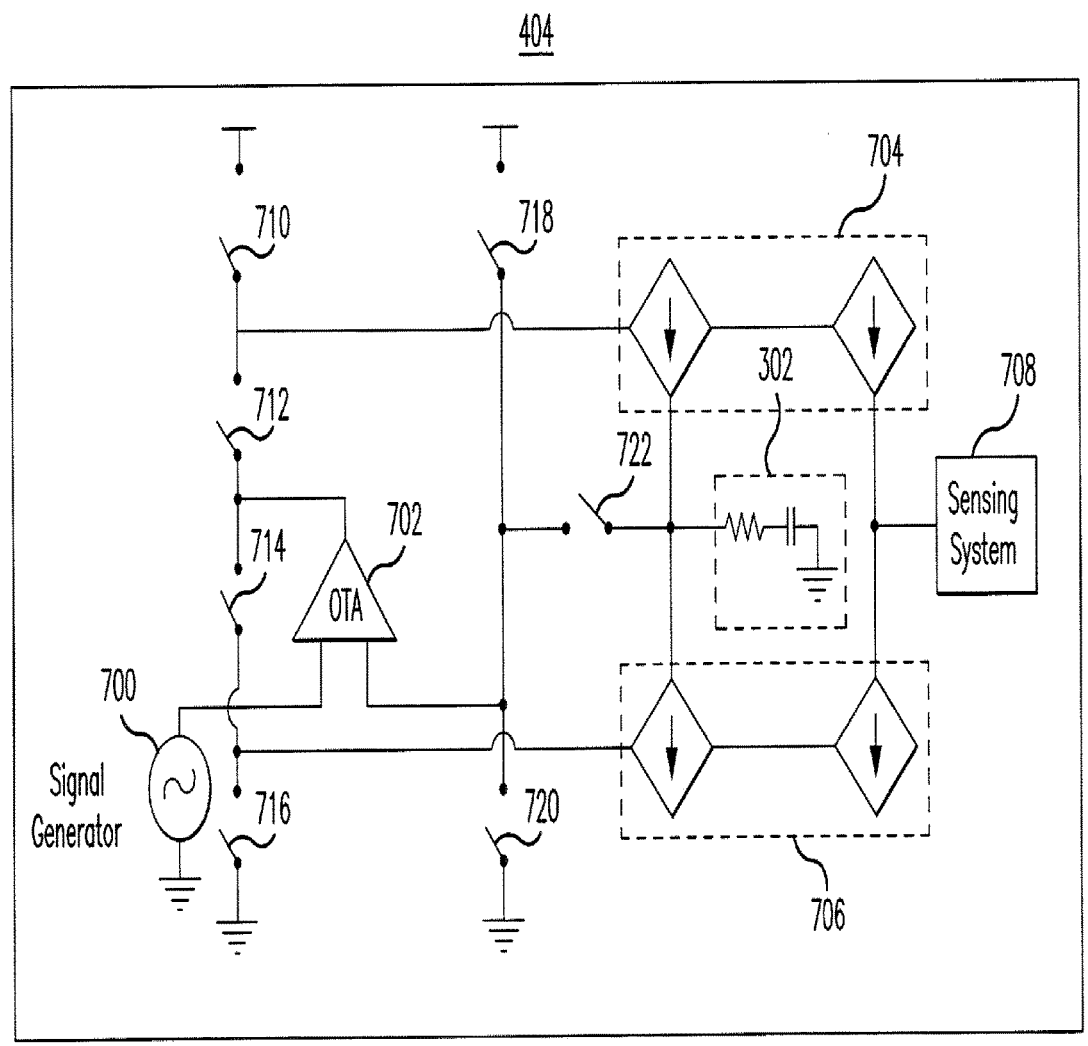
FIG. 7A illustrates an example touch sensor data acquisition unit, according to an embodiment of the present disclosure.
Figure 7B:
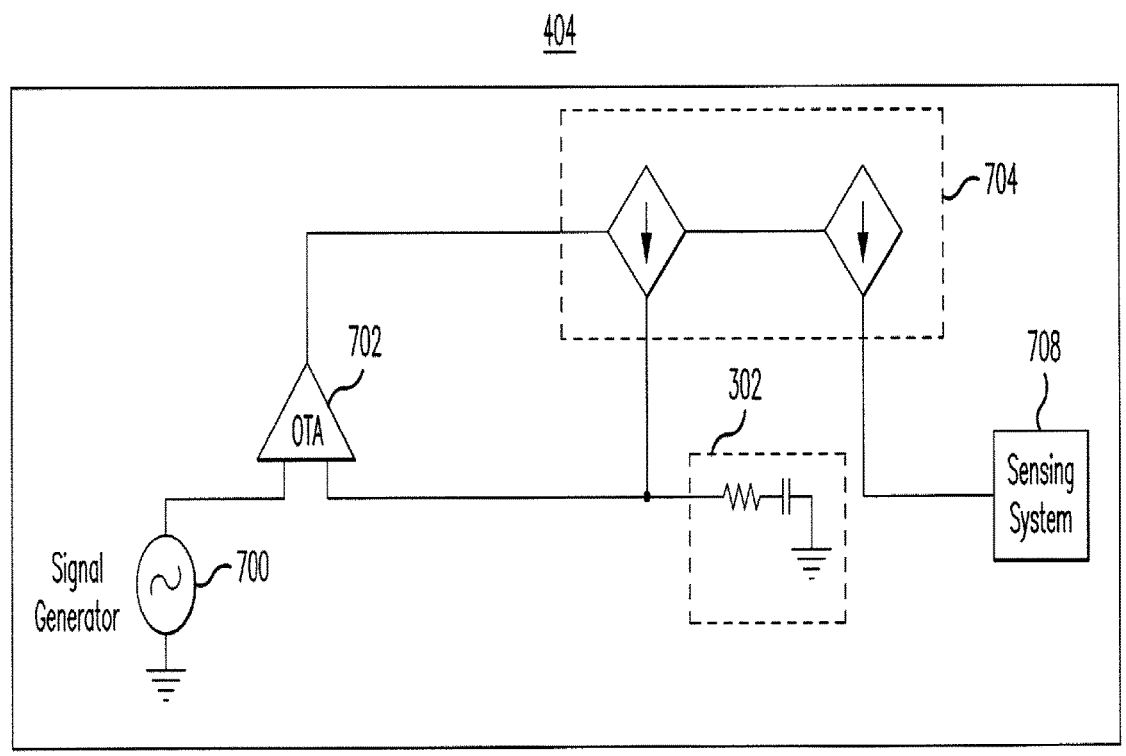
FIG. 7B illustrates a first modeled circuit representation of the example touch sensor data acquisition unit of FIG. 7A, according to an embodiment of the present disclosure.
Figure 7C:
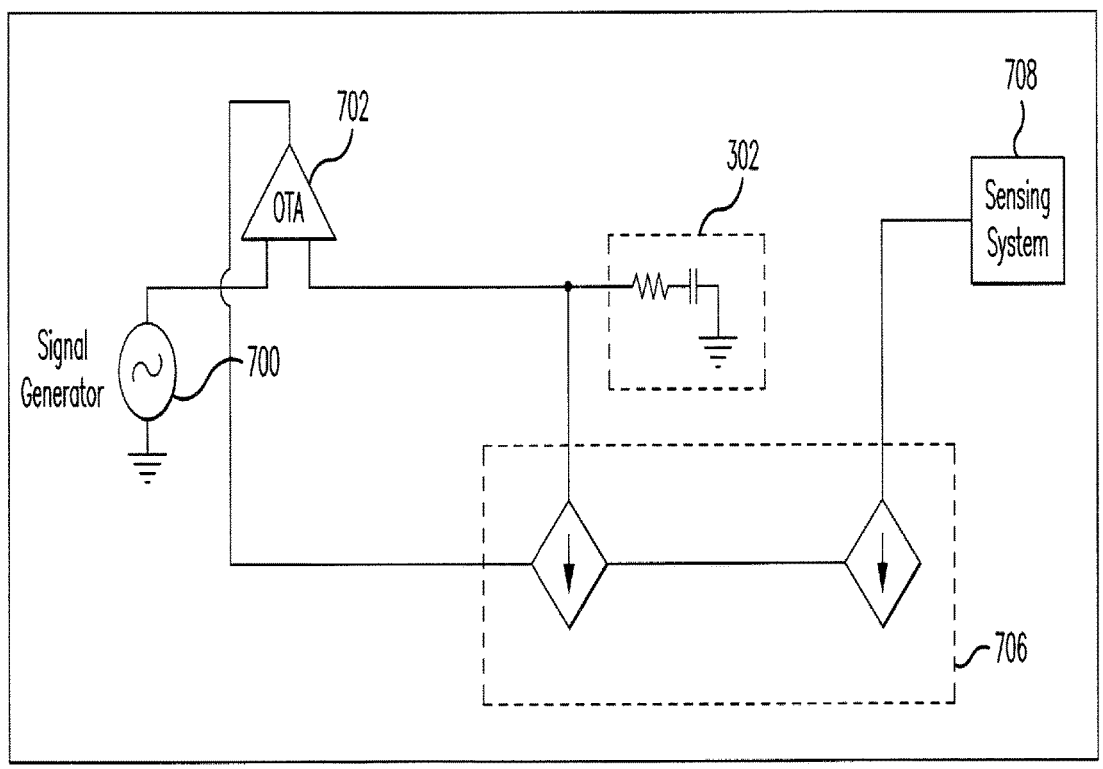
FIG. 7C illustrates a second modeled circuit representation of the example touch sensor data acquisition unit of FIG. 7A, according to an embodiment of the present disclosure.

FIG. 7A-7C illustrate an example touch sensor data acquisition unit 404 according to an embodiment of the present disclosure. The example touch sensor data acquisition unit 404 includes only one operational transconductance amplifier and a series of switches. In this example, the touch sensor data acquisition unit 404 drives and senses an electrode 302 simultaneously and continuously using only one operational transconductance amplifier. Furthermore, the touch sensor data acquisition unit 404 provides a safe transition phase that allows for the driver circuit to transition from a positive rate of change input voltage signal to a negative rate of change input voltage signal without creating a short circuit in the output.

As illustrated in FIG. 7A, the touch sensor data acquisition unit 404 includes a driver circuit 701 and a sensing system 708 coupled to the driver circuit 701. Driver circuit 701 includes an operational transconductance amplifier 702, a first current mirror 704, a second current mirror 706, and a series of switches 710, 712, 714, 716, 718, 720 and 722. Each of the switches 710, 712, 714, 716, 718, 720 and 722 is configured to open and/or close during particular phases of an alternating input voltage signal provided by signal generator 700. By opening and closing the switches 710, 712, 714, 716, 718, 720 and 722, the output of operational transconductance amplifier 702 can be directed to the current mirror 704 or 706. For example, the output of operational transconductance amplifier 702 can be directed to first current mirror 704 when the rate of change of the input voltage signal is positive. As another example, the output of operational transconductance amplifier 702 is directed to second current mirror 706 when the rate of change of the input voltage signal is negative. As a result, electrode 302 can be driven and sensed simultaneously and continuously. Additionally, this disclosure contemplates signal generator 700 being the same or similar to signal generator 500 and sensing system 708 being the same or similar to sensing system 510.

In one embodiment, one or more components of touch sensor controller 108, such as processor 400 and touch sensor data acquisition unit 404, open and close switches 710, 712, 714, 716, 718, 720 and 722 based on a rate of change of an input voltage signal provided by signal generator 700. For example, when a rate of change of the input voltage signal is positive, switches 712, 716 and 722 are closed and switches 710, 714, 718, and 720 are opened. As another example, when a rate of change of the input voltage signal is negative, switches 710, 714 and 722 are closed and switches 712, 716, 718 and 720 are opened. Processor 400 and touch sensor data acquisition unit 404 can track the input voltage signal and determine when the rate of change is positive and negative.

FIG. 7B illustrates a first modeled circuit representation of the example touch sensor data acquisition unit 404 of FIG. 7A when the rate of change of the input voltage signal provided by signal generator 700 is positive. As illustrated in FIG. 7B, the output of operational transconductance amplifier 702 is sent to first current mirror 704. In order to configure the driver circuit illustrated in FIG. 7A to be equivalent to the driver circuit illustrated in 7B, switches 712, 716 and 722 are closed and switches 710, 714, 718 and 720 are opened.

FIG. 7C illustrates a second modeled circuit representation of the example touch sensor data acquisition unit 404 of FIG. 7A when a rate of change of an input voltage signal provided by signal generator 700 is negative. As illustrated in FIG. 7C, the output of operational transconductance amplifier 702 is sent to second current mirror 706. To configure the driver circuit of FIG. 7A to be equivalent to the driver circuit of FIG. 7C, switches 710, 714 and 722 are closed and switches 712, 716, 718 and 720 are opened. In one embodiment, processor 400 and touch sensor data acquisition unit 404 open and close these switches.

In one embodiment, touch sensor data acquisition unit 404 is configured to provide a reset phase when a rate of change of the input voltage is at or around zero. The reset phase provides for a safe transition between a positive rate of change and a negative rate of change so that short circuits can be avoided. Before the rate of change reaches zero, certain switches can be opened and closed as part of the reset phase. During the reset phase, switches 710 and 716 are closed and switches 712, 714, and 722 are opened. Switches 718 and 720 are opened or closed depending on whether the rate of change of the input voltage signal is transitioning to positive or transitioning to negative. If the rate of change of the input signal is transitioning to positive, then switch 718 is opened and switch 720 is closed. If the rate of change of the input voltage is transitioning to negative, then switch 718 is closed and switch 720 is open. In one embodiment, switches 718 and 720 allow for the operational transcondutance amplifier 702 to be initialized. By using the reset phase touch sensor data acquisition unit 404 provides a safe transition between a positive rate of change and a negative rate of change.

Figure 8:
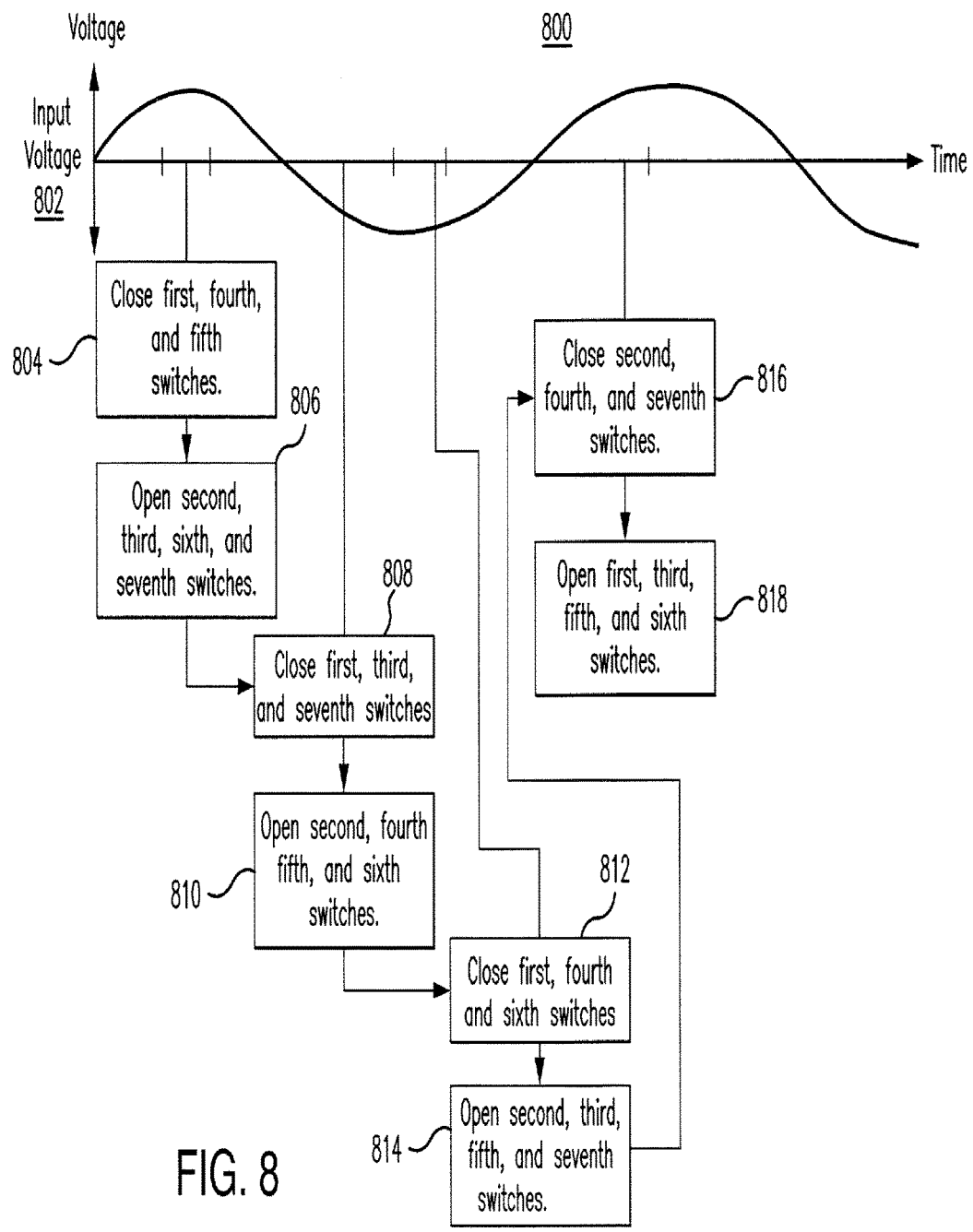
FIG. 8 illustrates an example method for controlling a touch sensor data acquisition unit, according to an embodiment of the present disclosure.

FIG. 8 illustrates an example method 800 for controlling a touch sensor data acquisition unit according to an embodiment of the present disclosure. In one embodiment, touch sensor data acquisition unit 404, processor 400, and/or touch sensor controller 108 perform method 800.

As illustrated in method 800, an input voltage 802 is provided by signal generator 700 to driver circuit 701. Input voltage 802 is an alternating voltage signal that is sinusoidal. This disclosure contemplates input voltage 802 taking on any form, such as a square wave and/or a triangle wave. During different phases of input voltage 802, various switches of touch sensor data acquisition unit 404 are opened or closed. In the first phase, the rate of change of input voltage 802 is at or around zero and transitioning to a negative rate of change. In this phase the switches are configured for what was previously described as the reset phase. In step 804, a first, fourth and fifth switches are closed, and in step 806, a second, third, sixth and seventh switches are opened.

In the next phase, the rate of change of input voltage 802 is negative. In this phase, the first, third and seventh switches are closed in step 808, and in step 810, the second, fourth, fifth and sixth switches are opened.

In the next phase, the rate of change of input voltage 802 is again at or around zero, but input voltage 802 is transitioning to a positive rate of change. In step 812, the first, fourth and sixth switches are closed, and in step 814, the second, third, fifth and seventh switches are opened.

In the next phase, the rate of change of input voltage 802 is positive. In step 816, the second, fourth and seventh switches are closed, and in step 818, the first, third, fifth and sixth switches are opened.

Figure 9A:
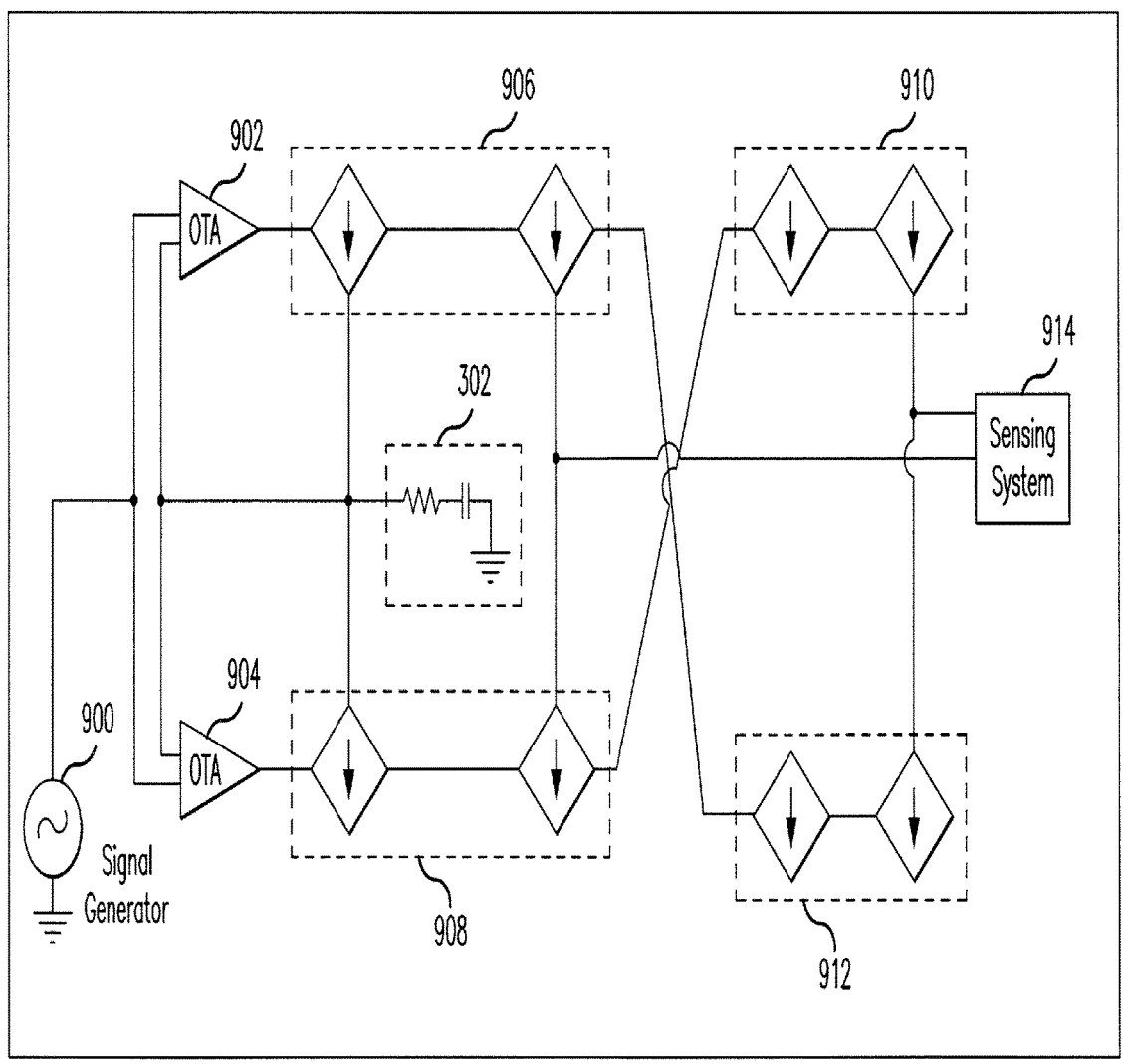
FIG. 9A illustrates an example touch sensor data acquisition unit, according to an embodiment of the present disclosure.

FIG. 9A illustrates an example touch sensor data acquisition unit 404 according to an embodiment of the present disclosure. As illustrated in FIG. 9A, touch sensor data acquisition unit 404 includes a driver circuit 901 and a sensing system 914 coupled to driver circuit 901. Driver circuit 901 includes a first operational transconductance amplifier 902, a second operational transconductance amplifier 904, a first current mirror 906, a second current mirror 908, a third current mirror 910, a fourth current mirror 912. In one embodiment, by adding third current mirror 910 and fourth current mirror 912, touch sensor data acquisition unit 404 allows sensing system 914 to perform differential touch sensing. Furthermore, this disclosure contemplates signal generator 900 being the same or similar to signal generator 500.

Differential touch sensing allows touch sensor data acquisition unit 404 to compare currents from adjacent electrodes 302. In this manner, the boundaries of a detected touch can be determined. In some instances a touch and/or a detected object will be detected by more than one electrode 302. By comparing the current flowing through adjacent electrodes 302 until two adjacent electrodes 302 with two different currents flowing through them are found, the boundary of a touch can be detected. For example, these two adjacent electrodes 302 indicate the boundary of the touch or detected object.

Signal generator 900, first operational transconductance amplifier 902, second operational transconductance amplifier 904, first current mirror 906, and second current mirror 908 are configured similarly to the driver circuit depicted in FIG. 5. Third current mirror 910 and fourth current mirror 912 invert the outputs of first current mirror 906 and second current mirror 908. For example, third current mirror 910 inverts and/or reverses the polarity of the output of second current mirror 908, and fourth current mirror 912 inverts the and/or reverses the polarity of the current of first current mirror 906. The outputs of third current mirror 910 and fourth current mirror 912 are sent to sensing system 914. As illustrated, the driver circuit provides two inputs to sensing system 914.

Figure 9B:
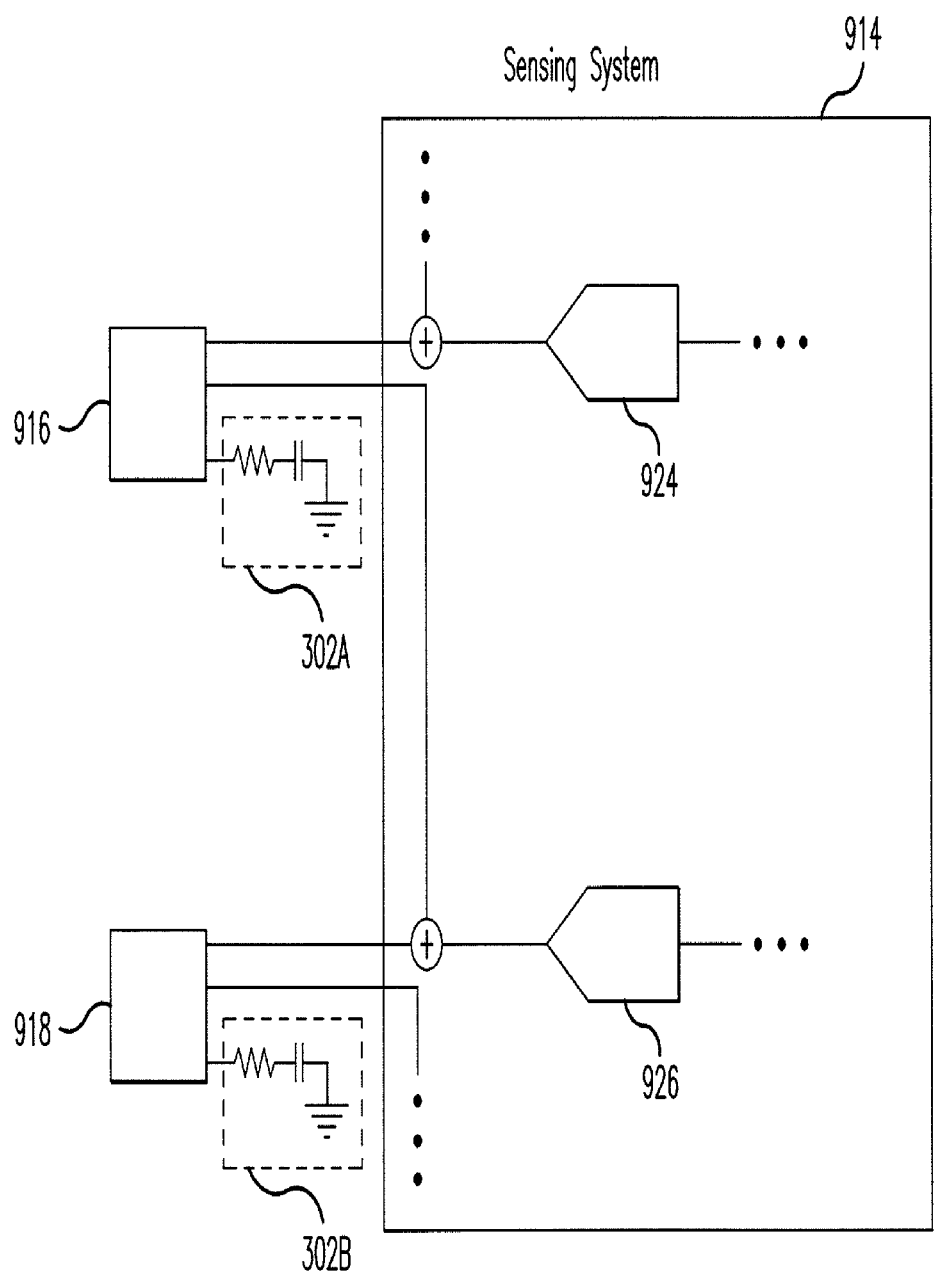
FIG. 9B illustrates an example sensing system, according to an embodiment of the present disclosure.

FIG. 9B illustrates an example sensing system 914 according to an embodiment of the present disclosure. Sensing system 914 receives signals from one or more driver circuits (such as driver circuits 916 and 918). Each driver circuit is coupled to a respective electrode. For example, as shown in FIG. 9B, driver circuits 916 and 918 are coupled to electrodes 302A and 302B respectively. Electrodes 302A and 302B are adjacent to each other. As a result, differential touch sensing can be performed on electrodes 302*a* and 302*b* along with other electrodes that are adjacent to electrodes 302*a* and 30*b*. In the example of FIG. 9B, sensing system 914 sums an output of driver circuit 916 and an output of driver circuit 918 in order to generate a summed output. Because these two outputs are opposite in polarity, the resulting sum is expected to be substantially zero (e.g. within 100 milliAmps) if electrodes 302A and 302B have currents with similar magnitudes flowing through them. If the sum is not zero, then sensing system 914 and/or processor 400 can determine that electrodes 302A and 302B form the boundary of a detected touch or detected object.

Sensing system 914 sums the other outputs of driver circuit 916 and driver circuit 918 with the outputs of other driver circuits for other electrodes adjacent to electrodes 302A and 302B. Sensing system 914 and/or processor 400 similarly compares these sums to determine the boundaries of a detected touch or detected object.

Sensing system 914 also includes amplifier circuits 924 and 926 that each receive a respective summed output. Each of the amplifier circuits 924 and 926 amplifies the respective current signal (corresponding to the respective summed output) so that the current signals can be processed. In one embodiment, by using sensing system 914 to sum the currents from two different driver circuits 916 and 918 that are opposite in polarity, the current handling requirements of current amplifiers 924 and 926 are relaxed.

Figure 10:
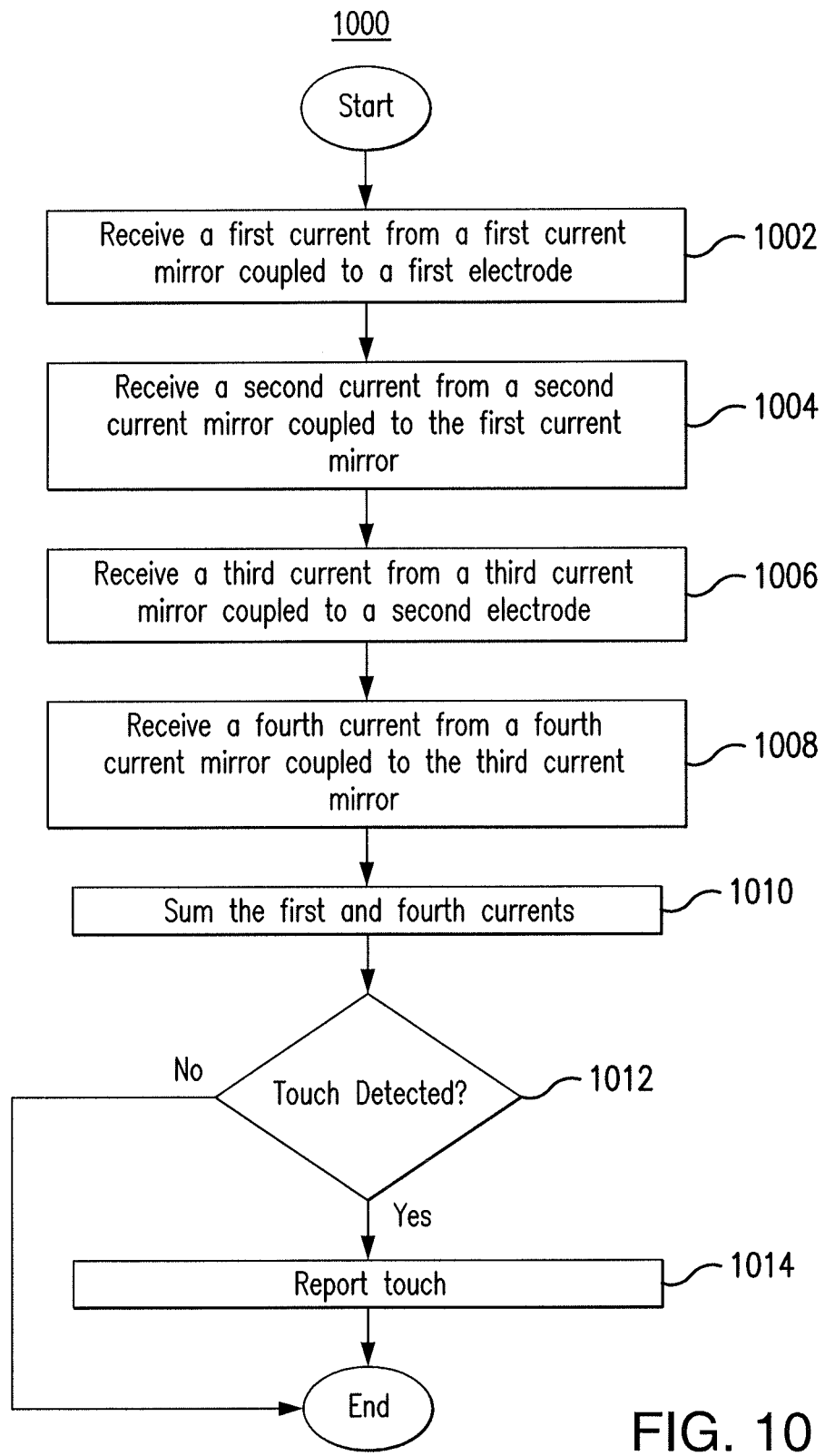
FIG. 10 illustrates an example method for detecting a touch, according to an embodiment of the present disclosure.

FIG. 10 illustrates an example method 1000 for detecting a touch according to an embodiment of the present disclosure. In one embodiment, various components of touch sensor data acquisition unit 404 perform method 1000. A first operational transconductance amplifier begins by driving a first current to a first current mirror in step 1005. In step 1010, the first current mirror mirrors the first current to produce a first mirrored current. A second current mirror mirrors the first mirrored current to produce a second mirrored current in step 1015. In step 1020, a second operational transconductance amplifier drives a second current to a third current mirror. The third current mirror mirrors the second current to produce a third mirrored current in step 1025. In step 1030, a fourth current mirror mirrors the third mirrored current to produce a fourth mirrored current. A sensing system sums the first mirrored current and the fourth mirrored current in step 1025. Based on this sum, the sensing system determines whether a touch is detected in step 1040. For example, if the sum is substantially zero (e.g., within 100 milliAmps), then a touch is not detected; however, if the sum is not substantially zero, then a touch is detected. Moreover, the sensing system may determine a boundary or location of the detected touch based on which electrodes of a touch sensor correspond to the first and second currents. If a touch is detected, the sensing system reports the touch in step 1045. Otherwise, the method concludes.

Although this disclosure describes and illustrates particular steps of the methods of FIGS. 6, 8, and 10 as occurring in a particular order, this disclosure contemplates any steps of the methods of FIGS. 6, 8, and 10 occurring in any order. An embodiment may repeat one or more steps of the methods of FIGS. 6, 8, and 10. Moreover, although this disclosure describes and illustrates particular components performing particular steps of the methods of FIGS. 6, 8, and 10, this disclosure contemplates any combination of any components performing any steps of the methods of FIGS. 6, 8, and 10.

Embodiments of the present disclosure provide one or more technical advantages. For example, one embodiment allows a self-capacitance touch sensor to drive and sense an electrode of the touch sensor simultaneously and continuously. As a result, initialization of certain components, such as the operational transconductance amplifier, is also avoided. Furthermore, an input impedance of the a sensing system does not limit the settling time of the system. As another example, one embodiment allows for current gain trimming by scaling the current mirrors. As yet another example, one embodiment relaxes current handling requirements of a sensing system by inverting sensed currents and by summing sensed currents from adjacent electrodes.

In one embodiment, touch sensitivity is increased by using the contemplated system. For example, rail-to-rail sensing is possible. As another example, the system can sense touches using high voltage signals. In one embodiment, by using current mirrors, the output impedance of the driver circuit is reduced. Furthermore, there is no quiescent current in the output driver stage.

Certain embodiments of the invention may include one or more of the above technical advantages. One or more other technical advantages may be readily apparent to one skilled in the art from the figures, descriptions, and claims included herein.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other computer-readable non-transitory storage media, or any combination of two or more of these. A computer-readable non-transitory storage medium may be volatile, non-volatile, or a combination of volatile and non-volatile. This disclosure contemplates memory 402 being a computer-readable non-transitory storage medium or media that stores instructions to be executed by processor 400. This disclosure further contemplates processor 400 executing these instructions to perform any of the functions of sensing systems 510, 708, and 914.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Additionally, components referred to as being "coupled" includes the components being directly coupled or indirectly coupled.

This disclosure encompasses a myriad of changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
driving, by a first driver circuit, a current through an electrode of a plurality of electrodes of a touch sensor, the first driver circuit comprising a first operational transconductance amplifier and a first current mirror coupled to the first operational transconductance amplifier; and
detecting, by a sensing system coupled to the first driver circuit, a touch based on a change in capacitance at the electrode of the plurality of electrodes of the touch sensor, wherein:
a second current mirror is coupled to the sensing system;
a first switch is coupled to the first current mirror;
a second switch is coupled to the first current mirror and to the first operational transconductance amplifier;
a third switch is coupled to the first operational transconductance amplifier and to the second current mirror;
a fourth switch is coupled to the second current mirror;
a fifth switch is coupled to the first operational transconductance amplifier;
a sixth switch is coupled to the first operational transconductance amplifier; and
a seventh switch is coupled to the first operational transconductance amplifier, the first current mirror, and the second current mirror.

2. The method of claim 1, further comprising:
closing the second switch, the fourth switch, and the seventh switch when a rate of change of an input voltage to the first driver circuit is positive; and
opening the first switch, the third switch, the fifth switch, and the sixth switch when the rate of change of the input voltage to the first driver circuit is positive.

3. The method of claim 1, wherein:
the first switch and the fourth switch are closed when a rate of change of an input voltage to the first driver circuit is zero; and
the second switch, the third switch, and the seventh switch are open when the rate of change of the input voltage to the first driver circuit is zero.

4. The method of claim 1, further comprising:
closing the first switch, the third switch, and the seventh switch when a rate of change of an input voltage to the first driver circuit is negative; and
opening the second switch, the fourth switch, the fifth switch, and the sixth switch when the rate of change of the input voltage to the first driver circuit is negative.

5. A method comprising:
driving, by a first driver circuit, a current through an electrode of a plurality of electrodes of a touch sensor, the first driver circuit comprising a first operational transconductance amplifier and a first current mirror coupled to the first operational transconductance amplifier;
detecting, by a sensing system coupled to the first driver circuit, a touch based on a change in capacitance at the electrode of the plurality of electrodes of the touch sensor;
providing, by the first current mirror, a first current to the sensing system;
providing, by a second current mirror coupled to the sensing system, a second current to the sensing system;
providing to the sensing system, by a third current mirror coupled to the first current mirror and to the sensing system, a third current that is opposite in polarity to the first current; and
providing to the sensing system, by a fourth current mirror coupled to the second current mirror and to the sensing system, a fourth current that is opposite in polarity to the second current.

6. The method of claim 5, wherein:
a second driver circuit is coupled to a second electrode of the plurality of electrodes; and
the first current mirror and the second current mirror are coupled to the second driver circuit.

7. A method comprising:
driving, by a first operational transconductance amplifier of a first driver circuit, a current through a first current mirror to an electrode of a plurality of electrodes of a touch sensor; and
detecting, by a sensing system coupled to the first driver circuit, a touch based on a change in capacitance at the electrode of the plurality of electrodes of the touch sensor, wherein:
a second current mirror is coupled to the sensing system;
a first switch is coupled to the first current mirror;
a second switch is coupled to the first current mirror and to the first operational transconductance amplifier;
a third switch is coupled to the first operational transconductance amplifier and to the second current mirror;
a fourth switch is coupled to the second current mirror;
a fifth switch is coupled to the first operational transconductance amplifier;
a sixth switch is coupled to the first operational transconductance amplifier; and
a seventh switch is coupled to the first operational transconductance amplifier, the first current mirror, and the second current mirror.

8. The method of claim 7, further comprising:
closing the second switch, the fourth switch, and the seventh switch when a rate of change of an input voltage to the first driver circuit is positive; and
opening the first switch, the third switch, the fifth switch, and the sixth switch when the rate of change of the input voltage to the first driver circuit is positive.

9. The method of claim 7, wherein:
the first switch and the fourth switch are closed when a rate of change of an input voltage to the first driver circuit is zero; and the second switch, the third switch, and the seventh switch are open when the rate of change of the input voltage to the first driver circuit is zero.

10. The method of claim 7, further comprising:

closing the first switch, the third switch, and the seventh switch when a rate of change of an input voltage to the first driver circuit is negative; and opening the second switch, the fourth switch, the fifth switch, and the sixth switch when the rate of change of the input voltage to the first driver circuit is negative.

\* \* \* \* \*